US009870912B2

(12) United States Patent
Rafferty et al.

(10) Patent No.: US 9,870,912 B2
(45) Date of Patent: Jan. 16, 2018

(54) MASS SPECTROMETERS HAVING REAL TIME ION ISOLATION SIGNAL GENERATORS

(71) Applicant: 1ST DETECT CORPORATION, Webster, TX (US)

(72) Inventors: David Rafferty, Webster, TX (US); Louis Johnson, Pasadena, TX (US)

(73) Assignee: 1st Detect Corporation, Webster, TX (US)

( * ) Notice: Subject to any disclaimer, the term of this patent is extended or adjusted under 35 U.S.C. 154(b) by 0 days.

(21) Appl. No.: 15/414,115

(22) Filed: Jan. 24, 2017

(65) Prior Publication Data

US 2017/0133214 A1 May 11, 2017

Related U.S. Application Data

(63) Continuation-in-part of application No. PCT/US2015/041699, filed on Jul. 23, 2015.

(60) Provisional application No. 62/029,026, filed on Jul. 25, 2014.

(51) Int. Cl.
*B01D 59/44* (2006.01)
*H01J 49/28* (2006.01)
*H01J 49/42* (2006.01)

(52) U.S. Cl.
CPC .......... *H01J 49/424* (2013.01); *H01J 49/426* (2013.01)

(58) Field of Classification Search
USPC ................................ 250/281, 290–293, 299
See application file for complete search history.

(56) References Cited

U.S. PATENT DOCUMENTS 5,075,547 A * 12/1991 Johnson .............. H01J 49/0063 250/282
5,171,991 A * 12/1992 Johnson .............. H01J 49/0063 250/282
5,248,882 A * 9/1993 Liang ..................... B01D 59/44 250/282
5,654,542 A * 8/1997 Schubert ............... H01J 49/428 250/282
6,710,336 B2 * 3/2004 Wells .................... H01J 49/424 250/292
7,154,088 B1 * 12/2006 Blain .................. H01J 49/0018 250/292
(Continued)

OTHER PUBLICATIONS

Guan, Shenheng et al., "Stored waveform inverse Fourier transform (SWIFT) ion excitation in trapped-ion mass spectrometry: theory and applications", International Journal of Mass Spectrometry and Ion Processes, vol. 157/158, pp. 5-37, 1996.
(Continued)

*Primary Examiner* — Bernard Souw
(74) *Attorney, Agent, or Firm* — Finnegan, Henderson, Farabow, Garrett & Dunner LLP

(57) ABSTRACT

Apparatuses, systems, and methods for performing mass analysis are disclosed. One such apparatus may include an ion trap device for use in a mass analysis system. The ion trap device may comprise an ion trap and a signal generator for applying an excitation signal to the ion trap. The signal generator may include a plurality of oscillators each configured to selectively generate a corresponding sinusoid signal to be selectively combined to form the excitation signal.

22 Claims, 4 Drawing Sheets

(56) References Cited

U.S. PATENT DOCUMENTS

2007/0162232 A1 * 7/2007 Patterson .............. H01J 49/022
702/1

OTHER PUBLICATIONS

International Search Report and Written Opinion dated Sep. 30, 2015, for PCT/US2015/041699, 14 pages.
March, Raymond E. et al., "Dynamics of Ion Trapping" in Quadrupole Ion Trap Mass Spectrometry—Second Edition, pp. 73-132, 2005.

* cited by examiner

MASS SPECTROMETERS HAVING REAL TIME ION ISOLATION SIGNAL GENERATORS

CROSS-REFERENCE TO RELATED APPLICATION

The present application is a Continuation-in-Part (CIP) of International Application No. PCT/US2015/041699, filed Jul. 23, 2015, which claims the benefit of priority to U.S. Provisional Application No. 62/029,026, filed Jul. 25, 2014. The entire contents of the above identified applications are expressly incorporated herein by reference.

FIELD OF THE DISCLOSURE

The present disclosure relates to apparatuses, systems, and methods for performing mass spectrometric analysis using ion traps. More particularly, the present disclosure relates to apparatuses, systems, and methods for mass-selective excitation, fragmentation, isolation and ejection of ions using a broadband signal composed of discrete sinusoids.

BACKGROUND OF THE DISCLOSURE

An ion trap can be used to perform mass spectrometric chemical analysis, in which gaseous ions are trapped and ejected according to their mass-to-charge (m/z) ratio. The ion trap can dynamically trap ions from a measurement sample using a dynamic electric field generated by one or more driving signals. The ions can be selectively ejected corresponding to their m/z ratio by changing the characteristics of the electric field. The mass and relative abundance of different ions and ion fragments can be measured by scanning the characteristics of the electric field.

A typical mass spectrometer comprises an ionization source to generate ions from a measurement sample, an ion trap to separate ions according to their mass (or more specifically, mass to charge ratio), and an ion detector to collect filtered/separated ions and measure their abundance.

Tandem mass spectrometry (also referred to as MS/MS, $MS^2$, $MS^n$, etc.) refers to a mass analysis method in which ions may be first formed and stored in an ion trap, and then an ion of particular mass (which may be a parent ion or a fragment ion of the parent) may be selected from among them by isolating the parent ion from all other ions. The ion of interest may then be further dissociated by collisions with neutral species or other means to generate fragment ions (daughter ions). The daughter ions may then be ejected from the ion trap and analyzed using mass spectrometry techniques. One or more daughter ions can be further isolated and dissociated, thereby forming a chain analyses.

To isolate an ion for purpose of tandem MS, an RF trapping field may be scanned or ramped up to eject ions except for those having an m/z ratio of the ion of interest. The RF trapping field voltage or other system parameters such as the pressure may be adjusted and the remaining ions may be dissociated. Finally, the RF trapping field voltage may then be scanned again to allow the system to analyze any daughter ions resulting from any subsequent fragmentation.

Another method is to employ a second fixed frequency signal (in addition to the RF trapping field signal) to the ion trap. The fixed frequency is at a secular frequency in which a particular ion is resonant. The ion excited at its resonant frequency may gain energy rapidly and be ejected from the trap. If the secular frequency of a particular ion of interest is known, an excitation signal may be constructed to isolate the ion of interest by including frequency components of all other ions in the ion trap but not the secular frequency of the ion of interest. In this way, all the other ions can be ejected at once, leaving only the ion of interest in the trap. It may be desirable to isolate at least one ion in the trap, in which several frequencies components may be "skipped."

A typical method of constructing such an excitation signal is to perform stored waveform inverse Fourier transform (SWIFT), in which a time domain waveform corresponding to a desired frequency spectrum is calculated using inverse Fourier transform by a computer and downloaded to a signal generator of the ion trap. Because inverse Fourier transform is computationally complicated and time consuming, a typical SWIFT takes a relatively long time to finish, such as up to ten minutes. Therefore, it is desirable to develop ion trap systems and corresponding analyzing methods for performing tandem mass spectrometric analysis with improved speed, such as in real time.

SUMMARY OF THE DISCLOSURE

Some disclosed embodiments may involve apparatuses, systems, and methods for an ion trap device for use in a mass analysis system. The ion trap device may include an ion trap and a signal generator for applying an excitation signal to the ion trap. The signal generator may include a plurality of oscillators each configured to selectively generate a corresponding sinusoid signal to be selectively combined to form the excitation signal.

The preceding summary is not intended to restrict in any way the scope of the claimed invention. In addition, it is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments and exemplary aspects of the present invention and, together with the description, explain principles of the invention. In the drawings.

DETAILED DESCRIPTION OF THE EMBODIMENTS

Figure 1:
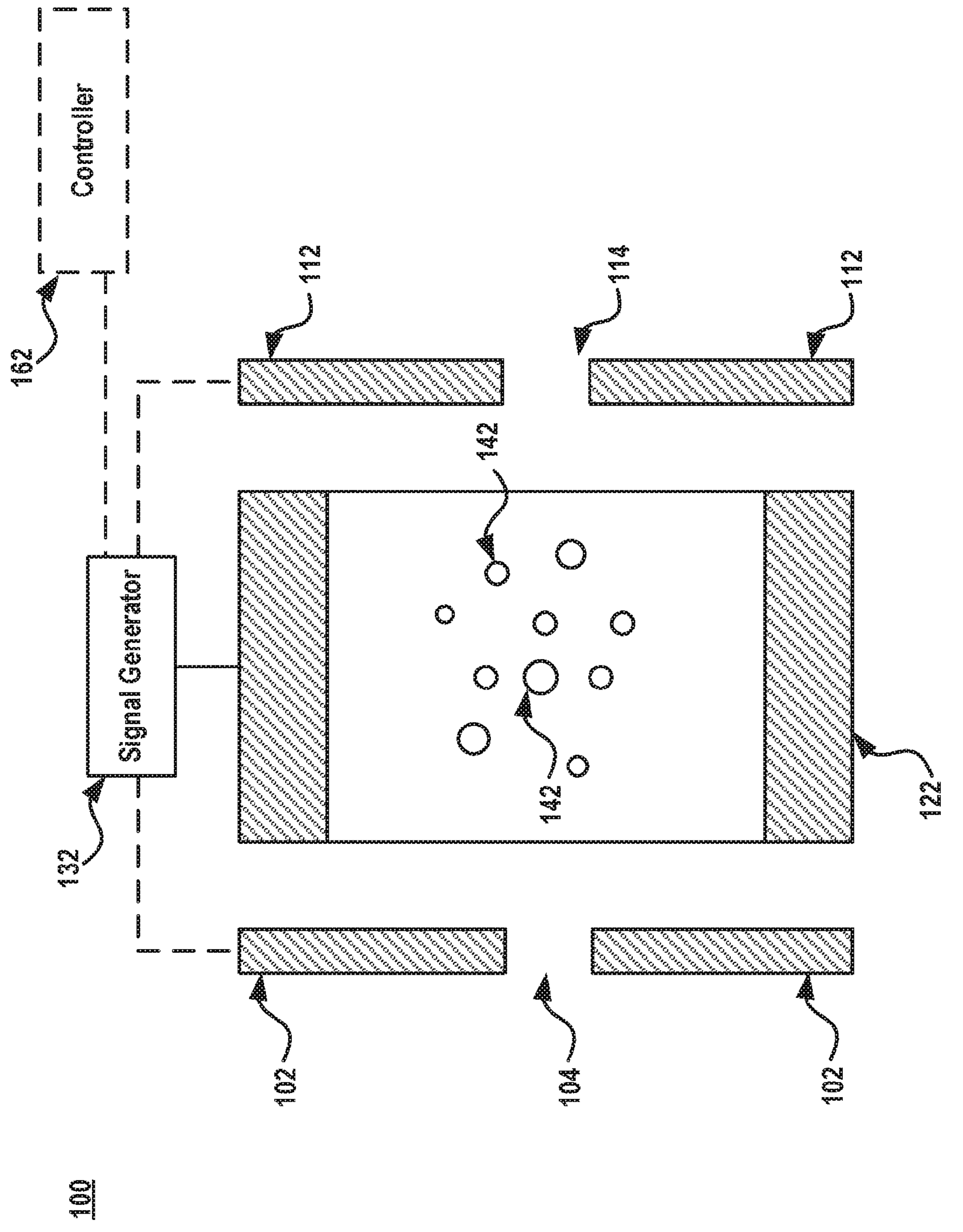
FIG. 1 is a schematic diagram of an exemplary mass analysis apparatus, in accordance with some disclosed embodiments.

Reference will now be made in detail to exemplary embodiments of the invention, examples of which are illustrated in the accompanying drawings. When appropriate, the same reference numbers are used throughout the drawings to refer to the same or like parts.

Embodiments of the present disclosure may involve apparatuses, systems, and methods for performing mass analysis.

As used herein, mass analysis refers to techniques of analyzing masses of molecules or particles of a sample material. Mass analysis may include mass spectrometry, in which a spectrum of the masses of the molecules or particles are generated and/or displayed. Mass analysis can be used to determine the chemical composition of a sample, the masses of molecules/particles, and/or to elucidate the chemical structures of molecules. Mass analysis can be conducted by using a mass spectrometer. A mass spectrometer may generally comprise three main parts: (1) an ionizer to convert some portion of the sample into ions based on electron impact ionization, photoionization, thermal ionization, chemical ionization, desorption ionization, spray ionization, and/or other suitable processes; (2) an ion trap that traps and ejects the sample ions according to their mass (or more particularly, by mass-to-charge (m/z) ratio); and (3) a detector that measures the quantity of ions sorted and expelled by the ion trap. Some mass spectrometers may generate ions within the trap itself; however, the trapping, sorting, and detecting functions proceed in the same manner.

Ion trap mass spectrometers take several forms. For example, ion traps may include 3D quadrupole ion traps, linear ion traps, and cylindrical ion traps, among others. A 3D ion trap typically comprises a central, donut-shaped hyberboloid ring electrode and two hyperbolic endcap electrodes. In basic usage, the endcaps are held at a static potential, and the RF oscillating drive voltage plus DC offset is applied to the ring electrode. Ion trapping may occur due to the formation of a quadrupolar trapping potential well in a central intra-electrode region when appropriate time-dependent voltage in applied to the electrodes. The ions orbiting in the trap become unstable in the Z-direction (center axis of the donut-shaped ring) of the well and are ejected from the trap in order of ascending m/z ratio as the RF voltage or frequency applied to the ring is ramped. The ejected ions can be detected by an external detector, for example an electron multiplier, after passing through an aperture in one of the endcap electrodes.

A linear ion trap (LIT) may have a cross section similar to that of a 3D ion trap, but whereas a 3D trap is radially symmetric about the Z axis, an LIT extends lengthwise. For example, an LIT may include four rods (or plates for a rectilinear ion trap) for radial ion confinement and two end caps for axial ion confinement. An excitation signal used to eject ions (generation of the excitation signal will be discussed in greater detail below) may be superimposed on two of the four rods. Alternatively, the excitation signal may be applied to the end caps. A trapping signal (will be discussed in greater detail below) may be applied to all four rods, for example, 0 degree RF phase to one pair of rods and 180 degrees RF phase to the other pair of rods. An advantage of an LIT is its larger trapping volume. LIT electrodes may also be substantially hyperbolic or substantially rectangular, where the latter is referred to as a rectilinear ion trap.

A cylindrical ion trap (CIT) generally refers to a 3D ion trap having substantially planar endcap electrodes and one or more cylindrical ring electrodes instead of hyperbolic electrode surfaces. A CIT can produce a field that is approximately quadrupolar near the center of the trap, thereby providing performance comparable to quadrupole ion traps having a donut-shaped hyberboloid ring electrode. CITs may be favored for building miniature ion traps and/or mass analysis devices because CITs are mechanically simple and can be more easily machined.

The techniques disclosed in this application can be applied to 3D quadrupole ion traps, LITs, and CITs.

FIG. 1 illustrates an exemplary apparatus for mass analysis. In FIG. 1, apparatus 100 includes an ion trap (e.g., a 3D ion trap, a LIT, or a CIT). The ion trap may include one or more endcaps. For example, in the embodiment shown in FIG. 1, apparatus 100 includes two endcaps 102 and 112. Endcap 102 may include an aperture 104. Endcap 112 may include an aperture 114. Apertures 104 and 114 may allow ions to enter and/or exit the ion trap. For example, ions can be injected into the ion trap through one of the apertures 104 and 114, and can be ejected or expelled from the ion trap through another one of the apertures 104 and 114. In some embodiments, the size of apertures 104 and 114 may be different. In other embodiments, the size of apertures 104 and 114 may be substantially the same. In further embodiments, ionization can be performed within the ion trap, with one or both endcap apertures 104 and 114 allowing for the injection of an ionizing beam such as electrons or ultraviolet light.

Endcaps 104 and 114 may comprise doped silicon, stainless steel, aluminum, copper, nickel plated silicon or other nickel plated materials, gold, and/or other electrically conductive materials, and may be formed by laser etching, LIGA, dry reactive ion etching (DRIE) and other types of etching, micromachining, and/or other manufacturing processes.

Apparatus 100 may include a ring electrode 122. As used herein, ring electrode 122 may also be referred to as center electrode 122. Ring electrode 122 may be substantially coaxial aligned with endcaps 102 and 112. In some embodiments, ring electrode 122 may have a substantially cylindrical annulus shape. In other embodiments, ring electrode 122 may have a hyperbolic profile. Ring electrode 122 and endcaps 102, 112, when employed, collectively define an internal volume of the apparatus 100. The internal volume may include one or more potential wells that can trap ions 142.

Apparatus 100 may also include a signal generator 132. Signal generator 132 may be connected to ring electrode 122 to provide an RF trapping signal. The RF trapping signal may generate the one or more electric fields, or potential wells, in the internal volume of apparatus 100 to trap ions 142. For instance, generator 132 may apply a radio frequency (RF) voltage to electrode 122 that causes an electric field to be generated in the internal volume defined by endcaps 102, 112 and ring electrode 122.

Signal generator 132 may also apply an excitation signal to endcaps 102 and/or 112, as illustrated by dashed lines in FIG. 1. The dashed lines indicate that signal generator 132 may connect to endcap 102 alone, to endcap 112 alone, or to both endcaps 102 and 112. In some embodiments, when signal generator 132 connects to one of the endcaps, the other endcap may be grounded or may connect to other signal sources or voltage references. In some embodiments, signal generator 132 may apply the excitation signal to ring electrode 122, instead of or in addition to endcaps 102, 112. In some embodiments, other techniques may be used such as coupling signals to or between the end caps, using multiple signal generators, etc. Signal generator 132 may generate the excitation signal to isolate one or more ions of interest by omitting frequency components in the excitation signal corresponding to the secular resonance frequency of one or more ions of interest, or including frequency components in the excitation signal corresponding to ions other than the one or more ions of interest. For example, if the m/z ratios of ions 142 trapped in apparatus 100 are known, isolating a particular ion of interest may be carried out by constructing an excitation signal that includes frequencies corresponding to the secular resonance frequency of all other ions in the ion trap, but not the frequency corresponding to the ion of interest. In other words, a particular frequency may be purposefully omitted in the spectrum of the excitation signal. In another example, if the m/z ratios of ions 142 trapped in apparatus 100 are not known, a relatively broad band spectrum minus the frequency corresponding to the ion of interest may be employed. In this way, those ions other than the particular ion of interest may be ejected out of the trap, leaving only the particular ion of interest in the trap. Further analysis may be conducted with respect to the particular ion of interest remaining in the trap. For example, a refined mass scanning may be conducted to analyze the characteristics of the isolated ion. A process of collision induced dissociation (CID) may be initiated to allow isolated ions (e.g., parent ions) to collide with each other to generate daughter ions. After the CID, a further excitation signal may be applied to isolate certain ions within the daughter ions. This excitation-isolation-CID cycle can repeat multiple times to refine the mass analysis process. In some embodiments, other methods of fragmenting and ionizing the isolated ion may be used such as secondary electron ionization, chemical ionization, etc.

In some embodiments, signal generator 132 may apply an isolation signal to endcaps 102 and/or 112. Signal generator 132 may apply the isolation signal during ionization or ion collection to prevent trapping of unwanted ions. For example, the isolation signal may include frequency components corresponding to unwanted ions to purposely exclude these ions from being trapped. By preventing the capture of unwanted ions, space charge effects can be reduced and sensitivity and dynamic range for the desired ions can be increased.

Apparatus 100 may include a controller 162 to control signal generator 132. Controller 162 may include one or more microprocessors, memory units, input/output interfaces, etc. In some embodiments, controller 162 may be part of apparatus 100. In some embodiments, controller 162 may be an external component with respect to apparatus 100 and may be communicatively connected to apparatus 100. In some embodiments, controller 162 may be integrated into signal generator 132. In some embodiments, controller 162 may be omitted.

Figure 2:
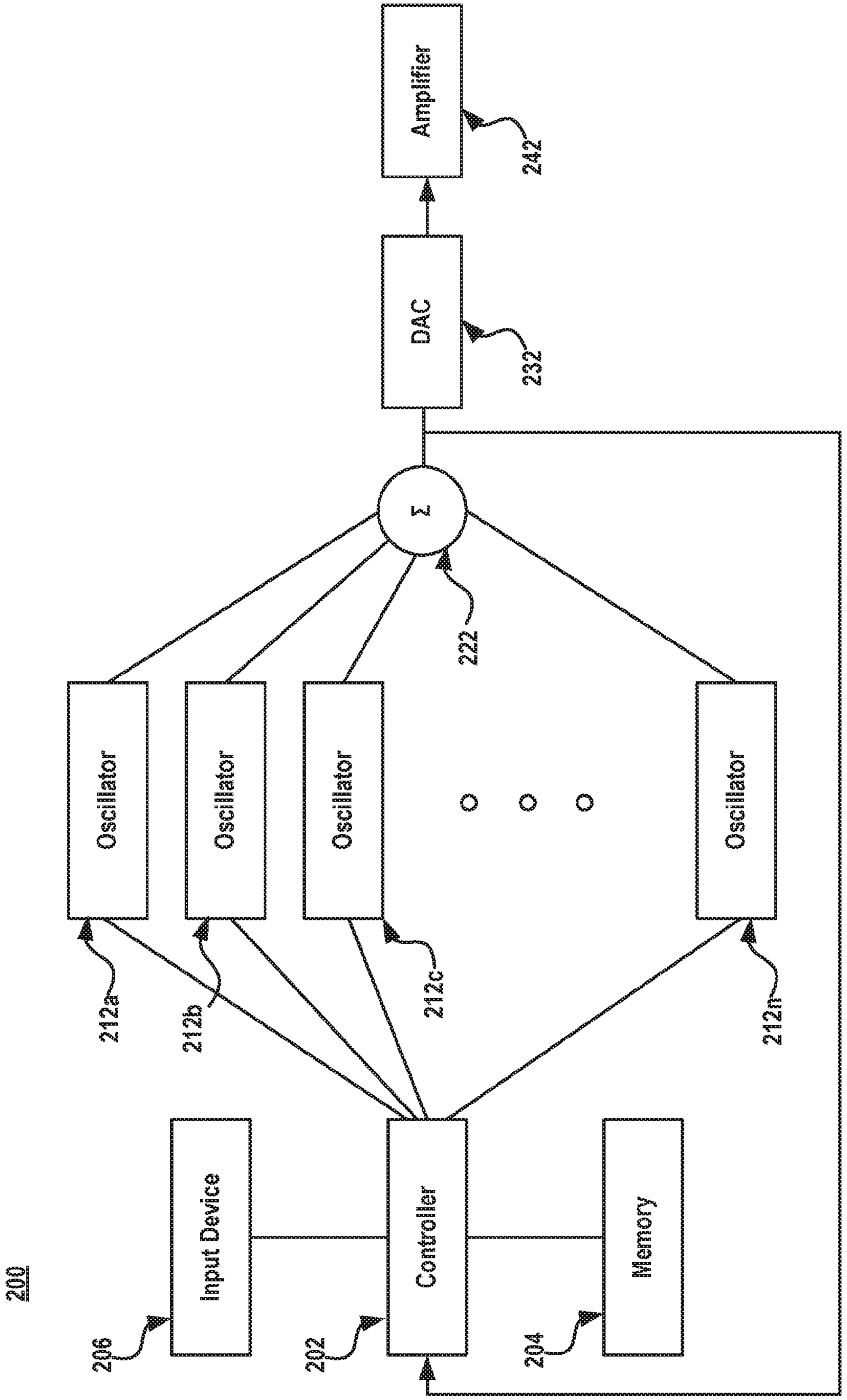
FIG. 2 is a schematic diagram of an exemplary signal generator, in accordance with some disclosed embodiments.

An example implementation of signal generator 132 is shown in FIG. 2. More particularly, FIG. 2 illustrates a schematic diagram of an exemplary signal generator 200, in accordance with some disclosed embodiments. Signal generator 200 may include a controller 202. In some embodiments, controller 202 may be the same device as controller 162 in FIG. 1. In some embodiments, controller 202 may be a separate device from controller 162. Controller 202 may include any computing devices, such as one or more microprocessors, digital signal processors (DSPs), field-programmable gate arrays (FPGAs), etc. Signal generator 200 may include a memory 204 communicatively connected to controller 202. Memory 204 may store instructions to perform one or more routines used for generating the excitation signal and/or the trapping signal. For example, memory 204 may store one or more databases, such as lookup tables of one or more signal profiles, used by a stored routine to generate an excitation signal and/or a trapping signal. Signal generator 200 may also include an input device 206, such as one or more buttons, a keyboard, a mouse, a touch screen, or other suitable inputting devices. Input device 206 may receive commands from a user. For example, the user may select one or more frequencies (or their corresponding ions) of interest and/or one or more frequencies (or their corresponding ions) that need to be ejected. The user may also specify various characteristics of the excitation signal corresponding to each frequency, such as frequency, amplitude, phase, among others.

Signal generator 200 may include a plurality of oscillators 212*a*-212*n*. The oscillators may be controlled by controller 202, e.g., based on excitation signal profiles or routines stored in memory 204. Each oscillator may be configured to generate a sinusoid signal (e.g., a sinusoidal wave). In some embodiments, the oscillators may be stand-alone or embedded hardware devices that receive control signals from controller 202 and output a sinusoid signal having a specified frequency, amplitude, and phase. In some embodiments, the oscillators may be software implemented logic units that output digital values corresponding to a digitized sinusoidal waveform. For example, controller 202 may read a value from a lookup table stored in memory 204 and send that value to oscillator 212*a*. The lookup table may contain digitized values of a sinusoidal waveform having a particular frequency, amplitude, and phase (e.g., phase offset). Oscillator 212*a* may be a memory storage unit, a register, or other logic units that capable of store the value. Similarly, other values may be sent to oscillators 212*b*, 212*c* . . . 212*n*, each corresponding to a sample point of a sinusoidal waveform having a particular frequency, amplitude, and phase. Controller 202 may send values to the oscillators in serial or in parallel. In some embodiments, controller 202 may address a particular oscillator to send a value. Each oscillator may be configured as a free running sinusoid signal generator outputting a sinusoid signal having a predetermined frequency, amplitude, and/or phase. Controller 202 may control individual oscillators to turn them on or off, and to modify their frequency, amplitude, and/or phase in real time by, for example, sending different values to them.

In one embodiment, each oscillator may correspond to a frequency component that excites a particular ion (e.g., with a particular m/z ratio) at its secular resonant frequency. A secular frequency may be determined for a particular m/z ratio. Signal generator 200 may include a large number of (e.g., several thousand or more) oscillators each acting as a programmable, free running, sinusoid digital source. The user may choose or program which frequencies are to be included or omitted in an excitation signal by specifying which oscillators are to be turned on or off, and the characteristics of the signals (e.g., frequency, amplitude, and/or phase) output by those oscillators that are turned on. These sinusoid signals can then be constructed into the desired excitation signal.

Signal generator 200 may include a digital summing device 222 that sum the output of the oscillators 212*a*-212*n*. Digital summing device 222 may be a hardware stand-alone or embedded device or may be a software implemented logic unit. In some embodiments, digital summing device 222 may include a memory unit, a register, or other logic units that sums the output of oscillators 212*a*-212*n* in real time. Digital summing device 222 may form a digital waveform by summing the plurality of sinusoid signals.

Digital summing device 222 may also feedback the formed digital waveform to controller 202. For example, the digital waveform formed by digital summing device 222 may include a full waveform intended to be converted to an analog signal by DAC 232. The full waveform may be sent back to controller 202. Controller 202 may receive the full waveform and store the full waveform in memory 204. In another example, the digital waveform formed by digital summing device 222 may include an intermediate waveform (e.g., by summing a subset of the full oscillator outputs). The intermediate waveform may be sent back to controller 202. Controller 202 may receive the intermediate waveform and use the intermediate waveform to reduce computation time and resource. For example, the intermediate waveform may be stored in memory 204 as a building component for forming a current and/or future full waveform. That is, instead of forming a complex waveform from scratch using individual oscillators every time, in some circumstances signals from a combination of certain oscillators may be pre-stored in memory 204 and then retrieved from memory 204 to form at least part of the desired full waveform. In this way, the computation time may be reduced and resources may be saved.

Signal generator 200 may include a digital-to-analog converter to convert the digital waveform output from the digital summing device 222 to an analog waveform. The analog waveform may have a profile substantially conform the desired excitation signal. In some embodiments, signal generator 200 may also include an amplifier 242. Amplifier 242 may amplify the analog waveform to the desired the amplitude or voltage level to drive the endcaps. In other embodiments, amplifier 242 may be provided as an external device separate from signal generator 200.

Figure 3:
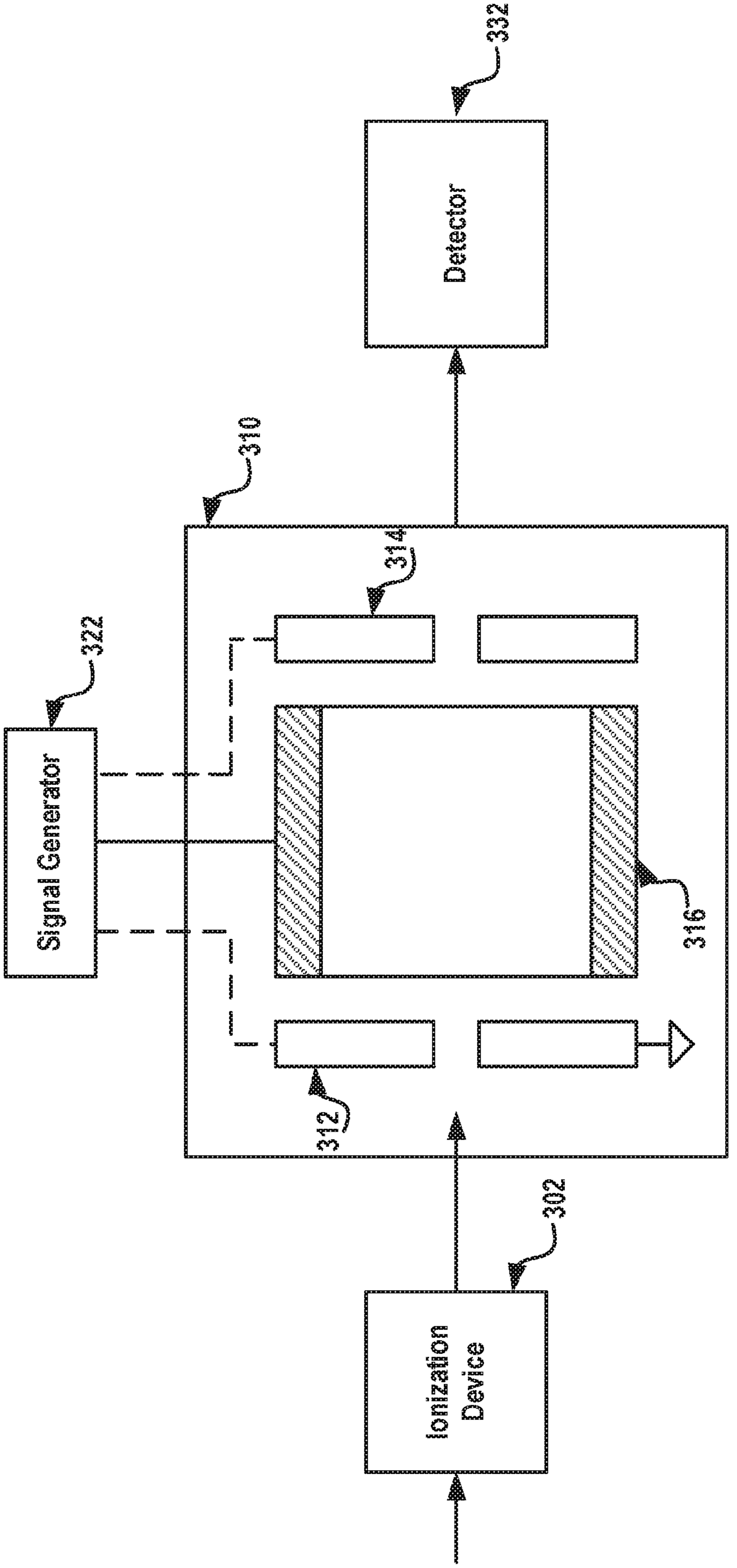
FIG. 3 illustrates a schematic diagram of an exemplary mass analysis system, in accordance with some disclosed embodiments.

FIG. 3 illustrates a schematic diagram of an exemplary mass analysis system, in accordance with some disclosed embodiments. The mass analysis system may include an ion trap device 310, an ionization device 302, and a detector 332. Ion trap device 310 may be similar to apparatus 100. For example, ion trap device 310 may include endcaps 312 and 314, a ring electrode 316, and a signal generator 322. In some embodiments, signal generator 322 may be part of ion trap device 310. In other embodiments, signal generator 322 may be separate from ion trap device 310. Ionization device 302 may be operable to convert some portion of a sample into ions based on electron impact ionization, photoionization, thermal ionization, chemical ionization, desorption ionization, spray ionization, glow discharge ionization, dielectric barrier discharge ionization, field ionization and/or other suitable processes. Ionization device 302 may perform the ionization within or external to the ion trap device 310. Detector 332 may include a Faraday cup, an image current detector, an electron multiplier, an array, or a microchannel plate collector. Other suitable detectors may also be used as part of mass analysis systems consistent with the disclosed embodiments.

Figure 4:
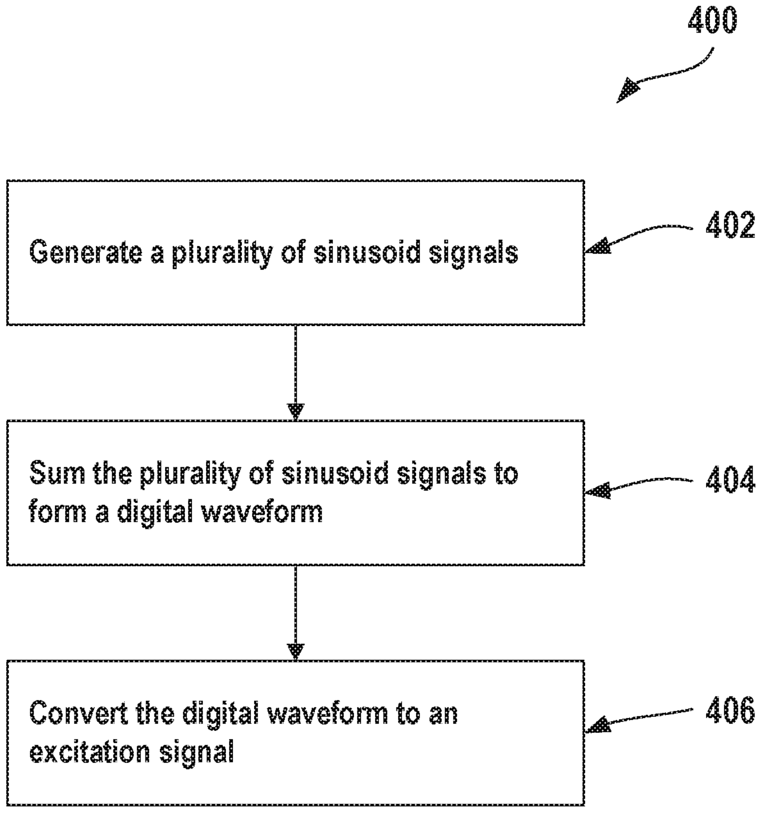
FIG. 4 is a flow chart of an exemplary method for generating an excitation signal to isolate an ion in an ion trap, in accordance with some disclosed embodiments.

FIG. 4 is a flow chart of an exemplary method for generating an excitation signal to isolate an ion in an ion trap, in accordance with some disclosed embodiments. In FIG. 4, an excitation signal generation method 400 includes a series of steps, some of them may be optional. In step 402, a plurality of sinusoid signals may be generated by a plurality of oscillators (e.g., oscillators 212*a*-212*n*). At least one of the frequency, amplitude, or phase of each sinusoid signal may be specified, set, modified, and/or programmed in real time (e.g., by controller 202). In addition, one or more sinusoid signals may be turned on or off in real time (e.g., by controller 202). Each sinusoid signal may be generated based on a lookup table stored in memory 204. In step 404, the plurality of sinusoid signals may be summed up (e.g., by digital summing device 222) to form a digital waveform. In step 406, the digital waveform may be converted to a desired excitation signal. For example, the digital waveform may be converted to an analog waveform (e.g., by DAC 232) and then amplified to the desired amplitude or voltage level of the excitation signal to drive one or more endcaps.

Some exemplary systems according to embodiments of the disclosed embodiments may significantly improve the operation speed. In addition, some exemplary systems according to embodiments of the present invention may require less computational power than that of typical SWIFT systems. The lower processing demands may translate to power savings, which may be particularly advantageous in portable and/or handheld applications having limited power supplies. In addition, a continuous frequency span may not be necessary to eject ions. Ions may be ejected by judiciously spaced discrete frequencies. Using a summed frequency comb instead of an inverse Fourier transform method may also allow the frequency comb to be tailored to prevent excessive constructive interference, allow apodization, and prevent excess energy from being spread across a continuous frequency span.

In the foregoing description of exemplary embodiments, various features are grouped together in a single embodiment for purposes of streamlining the disclosure. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this description of the exemplary embodiments, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the disclosure, as claimed. Thus, it is intended that the specification and examples be considered as exemplary only, with a true scope of the present disclosure being indicated by the following claims and their equivalents.

What is claimed is:

1. An ion trap device for use in a mass analysis system, the ion trap device comprising:

an ion trap; and a signal generator for applying an excitation signal to the ion trap, wherein the signal generator includes a plurality of oscillators each configured to selectively generate a corresponding sinusoid signal to be selectively combined to form the excitation signal.

2. The ion trap device of claim 1, wherein the sinusoid signal is a digital signal.

3. The ion trap device of claim 1, wherein each oscillator is configured to generate its sinusoid signal based on a lookup table.

4. The ion trap device of claim 1, wherein each oscillator is configured to generate its sinusoid signal having at least one of a predetermined frequency, a predetermined amplitude, or a predetermined phase.

5. The ion trap device of claim 1, wherein each oscillator is configured to modify at least one of a frequency, an amplitude, or a phase of its sinusoid signal in real time.

6. The ion trap device of claim 1, further comprising a controller communicatively connected to the plurality of oscillators, wherein the controller is configured to turn on or off one or more oscillators in real time.

7. The ion trap device of claim 1, wherein the signal generator further comprises a controller communicatively connected to the plurality of oscillators, wherein the controller is configured to turn on or off one or more oscillators in real time.

8. The ion trap device of claim 1, wherein the signal generator further comprises a digital summing device to sum the plurality of sinusoid signals to form a digital waveform.

9. The ion trap device of claim 8, wherein the signal generator further comprises a digital-to-analog converter to convert the digital waveform to an analog waveform.

10. The ion trap device of claim 9, wherein the signal generator further comprises an amplifier to amplify the analog waveform to generate the excitation signal.

11. The ion trap device of claim 1, wherein the signal generator is configured to apply the excitation signal to eject ions of a given mass from the ion trap.

12. The ion trap device of claim 1, wherein the plurality of oscillators are embedded into the signal generator.

13. A mass analysis system, comprising:
an ion trap device, including:
an ion trap;
a signal generator for applying an excitation signal to the ion trap, wherein the signal generator includes a plurality of oscillators each configured to selectively generate a corresponding sinusoid signal to be selectively combined to form the excitation signal; and
an ion detector.

14. The mass analysis system of claim 13, further comprising an ionization device for providing ions of a sample to be analyzed.

15. A method for generating an excitation signal to eject a particular ion from an ion trap, comprising:
generating a plurality of sinusoid signals that include at least one frequency component corresponding to the particular ion to be ejected from the ion trap;
summing the plurality of sinusoid signals to form a digital waveform;
converting the digital waveform to the excitation signal; and
applying the excitation signal to the ion trap, such that the particular ion will be ejected.

16. The method of claim 15, wherein converting the digital waveform to the excitation signal includes:
converting the digital waveform to an analog waveform; and
amplifying the analog waveform to the excitation signal.

17. The method of claim 15, wherein generating the plurality of sinusoid signals includes setting at least one of a frequency, an amplitude, or a phase for each sinusoid signal.

18. The method of claim 15, further comprising modifying at least one of a frequency, an amplitude, or a phase of one or more sinusoid signals in real time.

19. The method of claim 15, further comprising turning on or off one or more sinusoid signals in real time.

20. The method of claim 15, wherein generating the plurality of sinusoid signals includes generating the plurality of sinusoid signals based on a lookup table.

21. The method of claim 15, wherein applying the excitation signal includes applying the excitation signal during ionization or ion collection to prevent trapping of one or more ions.

22. The ion trap device of claim 1, wherein the ion trap includes a 3D quadrupole ion trap, a linear ion trap (LIT), or a cylindrical ion trap (CIT).

* * * * *